United States Patent Office 3,385,905
Patented May 28, 1968

3,385,905
PREPARATION OF OLIGOMERS OF MONO-
ALKENYL AROMATIC MONOMERS
James G. Smith and Charlotte Doreen Veach, Sarnia, Ontario, Canada, assignors to The Dow Chemical Company, Midland, Mich., a corporation of Delaware
No Drawing. Filed Feb. 18, 1966, Ser. No. 528,343
9 Claims. (Cl. 260—668)

This invention relates to a method for the preparation of oligomers which are low molecular weight polymers formed from a small number of molecules of the monomer, such as the dimers, trimers, tetramers, and so forth of monoalkenyl aromatic monomers. More particularly, this invention relates to a method for the preparation of oligomers of monoalkenyl aromatic monomers having the general forumla:

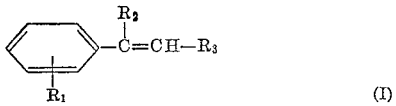

wherein $R_1$ is hydrogen, an alkyl group, an aryl group, a halogen, a nitro group, sulfonic acid group, or carboxylic acid group; $R_2$ is an alkyl group, an aryl group, or a substituted aryl group; $R_3$ is hydrogen or an alkyl group.

The known oligomerizing agents are either strong acids or inorganic halides such as stannic chloride, sulfuric acid, ferric chloride, aluminum chloride, and the like. Such known agents must be removed by neutralization or the products must be separated by extraction or distillation. These operations result in contamination or loss or destruction of the oligomerizing agent.

We have now discovered that oligomers of these monoalkenyl aromatic monomers can be conveniently and easily prepared. By the method of our invention the oligomerization of said monomers is carried out using trifluoroacetic acid as the solvent and oligomerization agent. Because of its volatility, this agent is easily and completely removed from the crude oligomer product by distillation or vacuum stripping. As a further advantage, the trifluoroacetic acid lends itself to a continuous process in which the acid is removed from the crude reaction mixture and recycled to the incoming monoalkenyl aromatic monomer, while the oligomeric reaction product is removed. If desired, the crude product may then be further purified by distillation or recrystallization.

The oligomer products which can be produced by the method of this invention include both cyclic dimers and linear oligomers. The cyclic dimers have the general formula:

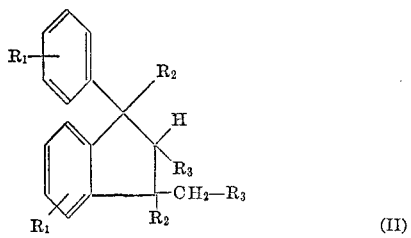

wherein $R_1$, $R_2$, and $R_3$ have the same meanings as their counterparts heretofore mentioned in the general Formula I for the monoalkenyl aromatic monomers.

The linear oligomers produced by the method of this invention have the general formula:

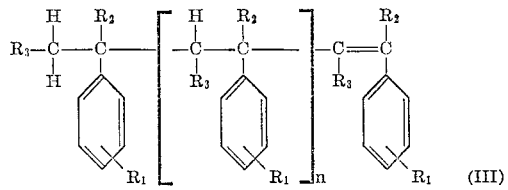

wherein $R_1$, $R_2$, and $R_3$ have the same meanings as their counterparts heretofore mentioned in the general Formula I for the monoalkenyl aromatic monomers, and $n$ is an integer from 0 to 8.

The above-mentioned oligomer products are useful, for example, as chemical intermediates, as plasticizers, as comonomers in addition polymerizations, and as lube oil additives.

The cognate advantages and benefits of this invention are obtained by contacting the heretofore mentioned monoalkenyl aromatic monomer in trifluoroacetic acid.

Monoalkenyl aromatic monomers which can be used in the practice of this invention include 1,1-diphenylethylene, alpha-methylstyrene, 1,1-diphenylpropene-1, 1-phenyl-1-naphthylbutene-1, 1,1-di-m-tolylethylene, 1,1-di-p-chlorophenylethylene, 1,1-di-p-nitrophenylethylene, 1,1-di-p-sulfophenylethylene, 1,1-di-p-carboxyphenylethylene, 2-p-chlorophenylbutene-2, 1-phenyl-1-biphenylethylene.

The reagent ratio, or weight of trifluoroacetic acid to monoalkenyl aromatic monomer, should be greater than 0.5:1 with the preferred ratio being from 1:1 to 10:1.

The preferred oligomerization reaction temperature is from $-15°$ C. (the freezing point of the trifluoroacetic acid) to the boiling point, 72° C. However, the lower reaction temperature is limited by the freezing point of the reaction mixture. Temperatures above this range can be used but require the use of pressure equipment and superatmospheric pressures and hence are less convenient to use. Further, the oligomerization can be carried out at a pressure corresponding substantially to the vapor pressure of the reaction mixture.

Isolation of the oligomer product on a large scale is preferably carried out by vacuum stripping to recover the triflouoroacetic acid. However, on a small scale, it is more convenient to quench the reaction with water and isolate the product by filtration.

The method of this invention consists essentially of a single step wherein the oligomers are formed. The yield is essentially quantitative. Depending upon the monomer starting material, the product may consist of a mixture of oligomers of different molecular weights, a mixture of isomers of the same molecular weight, or a single compound.

The following examples serve to illustrate our invention. It is, however, to be understood that our invention is not intended to be limited by these examples.

EXAMPLE I

Preparation of the cyclic dimer of 1,1-diphenylethylene which is 1,1,3-triphenyl-3-methylindane A round bottom flask equipped with a magnetic stirrer bar was charged at room temperature, 20° C., with 20 parts by weight of trifluoroacetic acid. The material was stirred and 2.0 parts by weight of 1,1-diphenylethylene was added (resulting in a reagent ratio of 10 to 1). A bluish-green color developed and a gum formed, changing in time to a solid. Stirring was continued for 24 hours, then the mixture was placed under vacuum, the trifluoroacetic acid being collected in a receiver cooled in a Dry Ice-acetone bath.

The crude solid residue amounted to 2.0 parts by weight having a melting point in the range 120°–135° C., and the trifluoroacetic acid collected amounted to 19.2 parts by weight for a 96 percent recovery. Recrystallization of the solid from 30 ml. absolute ethanol gave 1.28 parts (64 percent yield) of the cyclic dimer 1,1,3-triphenyl-3-methylindane, having a melting point of 141°–143.5° C.

While the primary crude produce from the reaction proved to be 1,1,3-triphenyl-3-methylindane (the cyclic dimer), a certain amount of 1,1,3,3-tetraphenylbutene-1 (the linear dimer) was also formed. These two isomers were clearly resolved by gas chromatography using a 4 ft. column, ¼ inch in diameter, packed with 15 percent silicone rubber on Chromosorb W. The column temperature was 235° C. with helium at 44 p.s.i.g. As the carrier gas.

EXAMPLE II

Following the procedure of Example I, except for varying the reaction time and reagent ratio as shown in Table A below, the effect of reaction conditions on the formation of dimer product from the monomer was determined.

TABLE A.—EFFECT OF REACTION CONDITIONS ON PRODUCT FORMATION

| Run No. | Reagent Ratio [1] | Reaction Time, hrs. | Crude Product Conversion,[2] Wt. Percent | Crude Product M.P., ° C. | Yield of Cyclic Dimer,[2] Wt. Percent | Yield of Linear Dimer,[2] Wt. Percent |
|---|---|---|---|---|---|---|
| 1 [3] | 10 to 1 | 24 | 98 | 120–135 | 49 | 4 |
| 2 | 10 to 1 | 0.5 | 92 | 112–131 | 81 | 11 |
| 3 | 10 to 1 | 2 | 96 | 120–135 | 90 | 6 |
| 4 | 10 to 1 | 6 | 95 | 120–135 | 91 | 4 |
| 5 | 0.01 to 1 | 24 | 5 | | | |
| 6 | 5 to 1 | 3 | 98 | 108–130 | 83 | 15 |
| 7 | 2 to 1 | 3 | 97 | 100–127 | 77.5 | 19.5 |
| 8 | 1 to 1 | 3 | 96 | 88–120 | 72 | 24 |

[1] Parts by weight trifluoroacetic acid/parts by weight 1,1-diphenylethylene.
[2] Based on the starting material.
[3] Example I.

It can be seen that the formation of the cyclic dimer is favored by long reaction times and high ratio of trifluoroacetic acid to alkene. Catalytic amounts of trifluoroacetic acid (Run No. 5 above) do not promote the reaction.

EXAMPLE III

Preparation of oligomers of alpha-methylstyrene

Trifluoroacetic acid (50 parts by weight) and alpha-methylstyrene (5 parts by weight) were stirred together at 25° C. for 5 hours, the reagent ratio being 10 to 1. Initially, a red color developed which faded through a pink to a yellow-orange. A hazy oil separated from solution as a second phase.

The final mixture was stripped under vacuum and the recovered tifluoroacetic acid collected at −60° C. A 96.5 weight percent recovery was obtained. The residual oil was examined by gas chromatography as in Example I and showed the presence of both the dimer and the trimer. The crude product was fractioned under vacuum to give the dimer, 4-methyl-2,4-diphenyl-pentene-2, boiling at 117°–120° C. at 2 mm. Hg, $n_D^{25}$ 1.5635, and the trimer, boiling at 190°–200° C. at 2 mm. Hg, $n_D^{25}$ 1.5854. A residue was left in the distilling flask in the form of a brittle glass which consisted of the tetramer and higher oligomers. The weight percent yield of crude product was: dimer, 55 percent; trimer, 25 percent; tetramer and higher, 12 percent.

EXAMPLE IV

Following the procedure of Example III, except for using a different reagent ratio and reaction time and varying the temperature as shown below in Table B, the effect of temperature upon alpha-methylstyrene oligomerization was determined.

TABLE B.—EFFECT OF TEMPERATURE UPON ALPHA-METHYLSTYRENE OLIGOMERIZATION

| Run No. | Reagent Ratio [1] | Reaction Time, Hrs. | Temp., ° C. | Yield, Wt. Percent [2] | | |
|---|---|---|---|---|---|---|
| | | | | Dimer | Trimer | Tetramer and higher |
| 1 | 5 to 1 | 3 | 0 | 51 | 28 | 10 |
| 2 | 5 to 1 | 3 | 28 | 64 | 16 | 9 |
| 3 | 5 to 1 | 3 | 72 | 74 | 7 | 9 |

[1] Parts by wt. trifluoroacetic acid/parts by wt. alpha-methylstyrene.
[2] Based on starting material.

It can be seen that the higher temperatures favor the formation of the lowest molecular weight oligomers, i.e., the dimers. The yield of crude product in all cases was about 90 weight percent.

What we claim and desire to secure by Letters Patent is:
1. A method for preparing oligomers of monoalkenyl aromatic monomers having the general formula

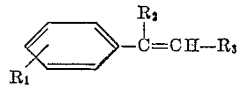

wherein $R_1$ is hydrogen, an alkyl group, an aryl group, a halogen, a nitro group, sulfonic acid group, or carboxylic acid group; $R_2$ is an alkyl group, an aryl group, or a substituted aryl group; $R_3$ is hydrogen or an alkyl group; which method comprises reacting the monoalkenyl aromatic monomer in trifluoroacetic acid with the weight ratio of trifluoroacetic acid to the monoalkenyl aromatic monomer being greater than 0.5:1.

2. A method according to claim 1, wherein the ratio of trifluoroacetic acid to the monoalkenyl aromatic monomer is from 1:1 to 10:1.

3. A method according to claim 1, wherein the reaction time is from 0.5 hour to 24 hours.

4. A method according to claim 1, wherein the reaction mixture is stirred.

5. A method according to claim 1, wherein the monoalkenyl aromatic monomer is 1,1-diphenylethylene.

6. A method according to claim 1, wherein the monoalkenyl aromatic monomer is alpha-methylstyrene.

7. A method according to claim 1, wherein the reaction temperature is between −15° C. and 72° C.

8. A method according to claim 1, wherein the trifluoroacetic acid is subsequently removed from the reaction mixture by vacuum distillation.

9. A method according to claim 1, wherein the reaction is carried out continuously by separating the trifluoroacetic acid from the oligomer product, then by combining with additional monoalkenyl aromatic monomer for subsequent reaction.

No references cited.

DELBERT E. GANTZ, *Primary Examiner.*

C. R. DAVIS, *Assistant Examiner.*